A. L. PUTNAM.
METALLIC VEHICLE WHEEL.
APPLICATION FILED APR. 28, 1919.
1,398,738.
Patented Nov. 29, 1921.
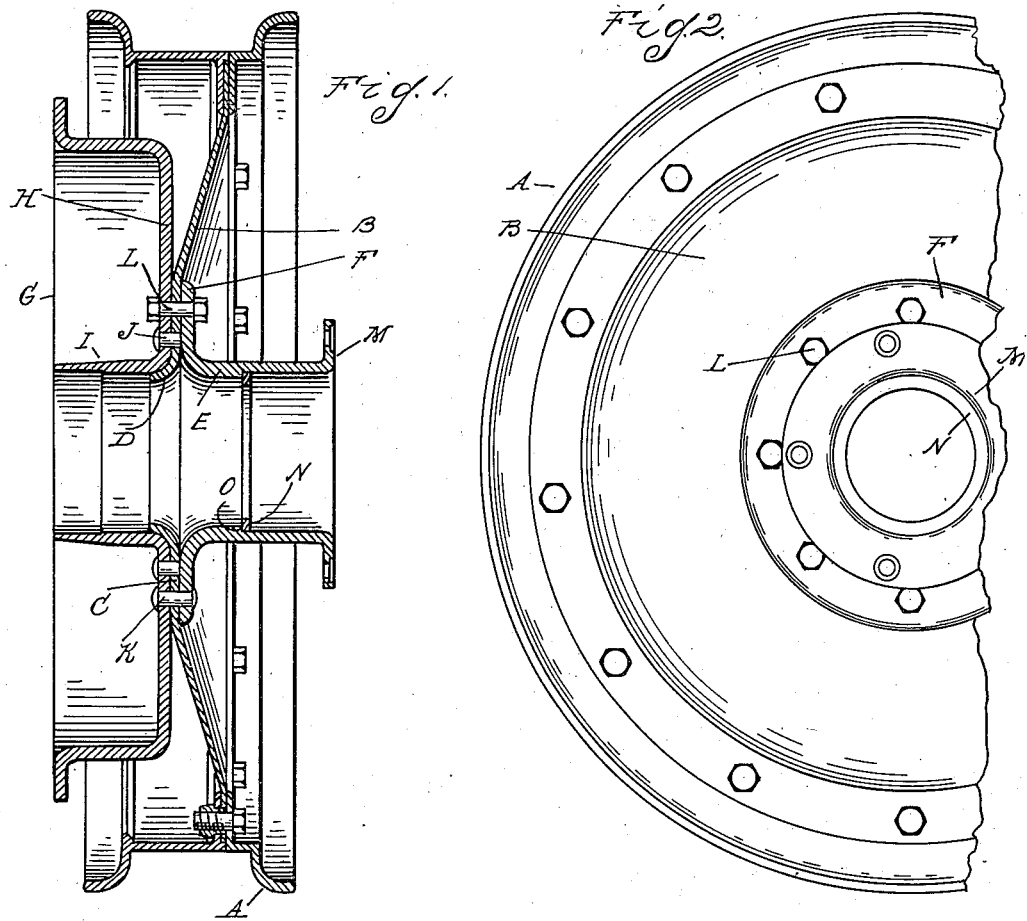
Inventor
Alden L. Putnam
By Whittemore Hulbert & Whittemore
Attorneys

UNITED STATES PATENT OFFICE.

ALDEN L. PUTNAM, OF DETROIT, MICHIGAN, ASSIGNOR, BY MESNE ASSIGNMENTS, TO DETROIT PRESSED STEEL COMPANY, OF WILMINGTON, DELAWARE, A CORPORATION OF DELAWARE.

METALLIC VEHICLE-WHEEL.

1,398,738. Specification of Letters Patent. Patented Nov. 29, 1921.

Application filed April 28, 1919. Serial No. 293,195.

*To all whom it may concern:*

Be it known that I, ALDEN L. PUTNAM, a citizen of the United States of America, residing at Detroit, in the county of Wayne and State of Michigan, have invented certain new and useful Improvements in Metallic Vehicle-Wheels, of which the following is a specification, reference being had therein to the accompanying drawings.

The invention relates to vehicle wheels of the disk type and consists in the novel construction as hereinafter set forth.

In the drawings:

Figure 1 is a central longitudinal section through the wheel;

Fig. 2 is a side elevation thereof.

In the construction of vehicle wheels which are used as drivers it is usual to provide a brake drum which is secured to the hub or disk of the wheel. With the present construction this brake drum is formed as an integral portion of the hub and together with a coöperating hub member constitutes the attachment for the disk.

In detail, A is the rim or felly of the wheel; B is the disk which, as shown, is of dished form and of a cross-section which increases from the center toward the periphery. The central portion C of this disk extends in the plane of the wheel and is provided with a curved laterally projecting flange D. E is a hub member having a flange F which is parallel and lies adjacent to the portion C of the disk. G is a brake drum formed with a cylindrical outer portion, a radial inwardly projecting portion H parallel to the plane of the wheel and a substantially cylindrical inner flanged portion I which constitutes a complementary portion of the hub. The portion H lies adjacent to the portion C of the disk and may be secured thereto by rivets J or other suitable means, the flange D constituting a pilot for accurately centering the drum with the disk. This flange D also constitutes an abutment shoulder for taking the end thrust of the bearing placed within the hub. The hub section E is secured to the disk and member G either by rivets, as indicated at K, or by clamping bolts L. The section E may be provided with a radial outwardly-extending flange M for connection with the driver, and a ring N placed within said section and bearing against a shoulder O is adapted to receive the end thrust of the bearing in this portion of the hub.

The forming of the brake drum as integral with a portion of the hub simplifies the construction and both of these portions may be formed simultaneously in the press.

What I claim as my invention is:

1. In a vehicle wheel, a pressed sheet metal member having an outer cylindrical flange, a radial inwardly-extending portion and an inner concentric cylindrical flange constituting a portion of the hub, a coöperating hub secured to and extending oppositely from said radial inwardly extending portion, and a disk member secured between said hub section and the first-mentioned member, said disk having an inner flange for fitting within the inner concentric cylindrical portion and constituting a pilot for centering the hub with the disk.

2. In a vehicle wheel, a hub formed in two portions having parallel radial outwardly extending portions, a disk secured between said radial outwardly extending portions and having a curved flange for fitting within one of said portions constituting a pilot for centering the hub with the disk, and a brake flange formed integral with one of said radial outwardly extending portions.

3. In a vehicle wheel, a hub section and a brake drum formed from an integral pressed sheet metal member, and a disk wheel member secured to said hub section and having a flange fitting within said hub section, constituting a pilot and centering said section with said disk member.

4. A vehicle wheel comprising a hub formed in two sections, and a brake drum integral with one section thereof, said sections being reversely formed with interior shoulders for opposite engagement by bearing members.

5. In a vehicle wheel, the combination with a pressed sheet metal member, comprising a hub section and an integral brake drum, of a disk wheel member, secured to said hub section, and means formed upon one of said members engaging the other member to relatively center the two members.

6. A vehicle wheel comprising a hub formed in two sections, a brake drum integral with one of said sections, said drum and integral section being formed of pressed sheet metal, a flange integral with the other section, a disk wheel member clamped between said brake drum and flange, and members effecting the clamping engagement passing through said flange, disk and drum.

7. In a vehicle wheel, the combination with a rim and a two part hub, of a dished disk peripherally secured to said rim and clamped between the parts of said hub, in close proximity to the plane of impact established by said rim.

In testimony whereof I affix my signature.

ALDEN L. PUTNAM.